(12) United States Patent
Kenner et al.

(10) Patent No.: US 6,181,867 B1
(45) Date of Patent: *Jan. 30, 2001

(54) VIDEO STORAGE AND RETRIEVAL SYSTEM

(75) Inventors: Brian Kenner, Encinitas; Harry Gruber, San Diego, both of CA (US)

(73) Assignee: Intervu, Inc., San Diego, CA (US)

( * ) Notice: Under 35 U.S.C. 154(b), the term of this patent shall be extended for 0 days.

This patent is subject to a terminal disclaimer.

(21) Appl. No.: 08/486,517

(22) Filed: Jun. 7, 1995

(51) Int. Cl.⁷ .............................. H04N 5/76; G06F 17/30
(52) U.S. Cl. .............................. 386/46; 386/125; 701/10; 701/104
(58) Field of Search .............................. 386/46, 112, 111, 386/125, 124; 348/12, 13, 5, 7; 707/10, 104; 395/200.47

(56) References Cited

U.S. PATENT DOCUMENTS

| | | |
|---|---|---|
| 4,920,432 | 4/1990 | Eggers et al. . |
| 4,949,187 | 8/1990 | Cohen .................................. 358/335 |
| 4,949,248 | 8/1990 | Caro . |
| 5,172,413 | 12/1992 | Bradley et al. . |
| 5,208,665 * | 5/1993 | MacCalley et al. .................... 348/12 |
| 5,229,993 | 7/1993 | Foundriat et al. .................. 370/85.3 |
| 5,236,199 | 8/1993 | Thompson, Jr. ...................... 273/439 |
| 5,253,341 | 10/1993 | Rozmanith et al. . |
| 5,287,530 | 2/1994 | Davis et al. ......................... 370/94.1 |
| 5,291,554 | 3/1994 | Morales . |
| 5,307,456 | 4/1994 | MacKay .............................. 395/154 |
| 5,371,532 | 12/1994 | Gelman et al. . |
| 5,410,343 | 4/1995 | Coddington et al. . |
| 5,414,455 | 5/1995 | Hooper et al. . |
| 5,442,389 | 8/1995 | Blahut et al. . |
| 5,442,390 | 8/1995 | Hooper et al. . |
| 5,442,749 | 8/1995 | Northcutt et al. . |
| 5,475,615 | 12/1995 | Lin . |
| 5,508,732 | 4/1996 | Bottomley et al. . |
| 5,515,511 | 5/1996 | Nguyen et al. . |
| 5,519,435 | 5/1996 | Anderson . |
| 5,528,281 | 6/1996 | Grady et al. . |
| 5,544,313 | 8/1996 | Shachnai et al. . |
| 5,544,327 | 8/1996 | Dan et al. . |
| 5,550,577 | 8/1996 | Verbiest et al. . |
| 5,550,863 | 8/1996 | Yurt et al. . |
| 5,550,982 | 8/1996 | Long et al. . |
| 5,557,317 | 9/1996 | Nishio et al. . |
| 5,559,707 * | 9/1996 | DeLorme ............................. 364/443 |
| 5,596,494 * | 1/1997 | Kuo ..................................... 364/420 |

FOREIGN PATENT DOCUMENTS

| | | |
|---|---|---|
| 0 649 121 | 4/1995 | (EP) . |
| 0 651 554 | 5/1995 | (EP) . |

OTHER PUBLICATIONS

Berra, P.B. et al., "Architecture for Distributed Multimedia Database Systems", *Computer Communications*, vol. 13, No. 4, May 1, 1990, pp. 217–231.

Little, T.D.C., et al., "Selection and Dissemination of Digital Video Via the Virtual Video Browser", *Multimedia Tools and Applications*, vol. 1, No. 2, Jun. 2, 1995 (Netherlands), pp. 149–172.

* cited by examiner

Primary Examiner—Huy Nguyen
(74) Attorney, Agent, or Firm—Darby & Darby

(57) ABSTRACT

A video clip storage and retrieval system whereby video clips, stored locally and/or at a more remote location, can be requested and retrieved by a user at the user's multimedia terminal. When the user requests a desired video clip, the request is processed by a primary index manager ("PIM") via a Local Search and Retrieval Unit ("SRU"). Before the message is communicated to the PIM, the local SRU checks its own storage to see whether the requested video clips are available locally. If some of the video clips are local, the local SRU still forwards the request to the PIM so that the PIM may determine specific video clip usage. The PIM determines the extended SRU where the audio-visual data is stored and passes this information to a Data Sequencing Interface ("DSI"). The DSI collects the video clips and downloads the clips to the user's terminal. The user may then view, copy, or print the video clip as desired.

21 Claims, 3 Drawing Sheets

DSI A/V SEQUENCING & STORAGE MANAGEMENT LOGIC

QUERY & SEARCH LOGIC

VIDEO STORAGE AND RETRIEVAL SYSTEM

This invention relates to a distributed video clip storage and retrieval system, and more particularly, to a system whereby video clips, stored locally and at a remote location, can be requested and retrieved at a user's multimedia terminal with or without sound and associated database information.

BACKGROUND OF THE INVENTION

The prior art is primarily directed towards text or image database providers, and so-called "video on demand" systems. These systems are not designed to store text and video or audio-visual data across multiple computer systems in a distributed network. The "video on demand" concept is based primarily on a host-client architecture for downloading real-time audio-visual data, in very large amounts at a very high speed. Such systems aim, for example, to provide full-length movies, with sound, to on-line subscribers. Typically, remote users communicate with large main-frame servers containing the audio-visual data.

The host-client architecture of such systems stems from the desire to eliminate bandwidth limiting elements in the system by locating the video data solely on the provider's high-capacity system. The provider must then insure that hardware and software used to distribute this data is capable of the very high storage and transmission rates required, and is virtually error free, so that no perceivable data is corrupted or lost.

Known and proposed "video on demand" systems involve expensive and sophisticated computer and communication systems which are adapted to feed full length movies to attached subscribers "on demand." Such systems use a massively parallel computing architecture, in an attempt to adapt the multi-processing computing system to manage the monumental video data delivery requirements of hundreds of simultaneous users. Each multi-processing computer is a single "mainframe" computer and operating system with numerous intricately interconnected individual microprocessors. The massively parallel computers also have very high speed internal data buses with the capability of sustaining a significant but fixed level of internal data traffic.

Massively parallel systems present three distinct disadvantages: (1) reliability, (2) cost, and (3) they are not scalable. Since video data is highly storage intensive, a very large number of hard drives are required to sustain the system. This requirement substantially increases cost. Further, because the hard drive is generally the most unreliable aspect of any computing system, using a large number of hard drives contributes significantly to making the overall system more unreliable. Also, due to the centralized systems basic structure, it is not scalable.

Another system employing large mainframe servers to store the audiovisual data for delivery to a small number of users depends on reducing hard drive throughput by developing specialized hard drive interface software. This software determines how the computer's operating system uses the computer's hard drive. For example, multiple blocks of related data can always stored sequentially, instead of randomly. Although this may lead to more effective data throughput rates, such systems have the ability to accommodate only about 40 simultaneous users, and are geared to in house, small scale, video distribution.

A limited or partial "distributed" architecture has been proposed, which would link multiple personal computers together in order to fashion a much larger monolithic functional unit. In this system, video data is distributed only to build a single, much larger source of digital video information. For example, a long video is assembled "on the fly" from separately stored pieces on different machines. Such a system might subsequently use ATM switch technology to merge the output of this array of computers into one or more continuous video streams.

By contrast, the invention provides a true or complete distributed architecture with increased reliability and the capability of supporting thousands of simultaneously attached users, at a fraction of the cost of the massively parallel system.

Another aspect of the invention is its ability to allow a user to interact with the retrieved video clip. Technology to physically manipulate video information on personal computers is known. For example, video capture boards can receive a video signal from a television or VCR and can store video data for later editing or viewing. Video boards and systems of this kind can employ compression protocols, such as Motion Picture Experts Group ("MPEG") standards 1 and 2, and MJPEG, to store and transmit video data in a highly compressed state. This reduces the storage capacity and transmission time needed to work with the video data. Such systems allow a user to view and edit video on a personal computer terminal, but do not provide the capability of querying for desired video information, nor for access to corresponding text information.

By contrast, the invention not only distributes unlike databases (for example, a related but distinct "text database" and "audio-visual database") across the assorted computing and communication devices, but it also partitions and distributes data in a manner which maximizes the performance of the network as a whole.

In a preferred embodiment of the invention, the user, a real estate agent, has the capability of receiving up-to-date audio-visual information about a listed property. Presently, a real estate agent spends hours researching relevant aspects of available property, to include, inspecting the property, taking photographs of the property, and accumulating information about the property. In fact, the typical agent sees less than 50 percent of the new homes listed because of time constraints. Additional time and effort is spent ascertaining the prospective buyer's desires, introducing the buyer to the range of communities available within a chosen region, researching properties that the potential buyer may be interested in, and then showing these properties to the potential buyer.

According to the invention, a realtor's time will be more effectively used on activities directly related to selling property, and not on time intensive, activities necessary to stay abreast with market conditions. For example, by being able to view the property on a video terminal the realtor will reduce significantly the time spent researching potential properties. The time spent visiting properties with the potential buyer is likewise reduced by being able to introduce the property to the buyer via the video clip. This allows the realtor to devote more time to closings and other administrative duties associated with selling the property. Also, having the video retrieval capability allows the realtor to constantly refresh the customer's memory without having to revisit the property.

SUMMARY OF THE INVENTION

The invention is directed to a video clip storage and retrieval system whereby the user receives comprehensive data collected from one or more databases by request from a user's multimedia terminal. The comprehensive data is provided in the form of selected video clips coupled with corresponding database information.

A preferred embodiment of this invention is directed to the real estate industry. However, as will become readily apparent, the invention is applicable to a wide range of end uses where convenient access to corresponding audio-visual information would be useful. For example, the video clip retrieval system can be used for retail sales, dating services, travel services, and many other applications.

The video clip retrieval system is a distributed computer system or network whereby video clips and text information, stored locally and at a remote location, can be requested and viewed at a user's multimedia terminal. The system is partitioned into database index managers ("IMs"), extended storage and retrieval units ("extended SRUs"), data sequencing interfaces ("DSIs"), local storage and retrieval units ("local SRUs"), and user terminal modules. Each partition supports features important to the operation and management of the system, but are not necessarily assigned to a specific physical computer or communication component.

In operation, a user first builds a request at a user terminal. The request is transmitted to the user's primary index manager ("PIM") via a local storage and retrieval unit (local SRU). The local SRU attaches a Regional Identifier to the request to assist the PIM to efficiently search for, locate and report on the requested information. The local SRU provides temporary storage for the user's most requested video clips, and before the query is sent to the user's PIM, the local SRU is polled for requested video clips. The user query, amended to contain a Regional identifier and to reflect any local matches, is then forwarded to the PIM.

The PIM uses the Regional Identifier to identify remote IMs which may have the requested video information. The PIM also checks to see whether the video clips stored at the local SRU are current. The PIM then queries its own video clip listing and the listing for the remote IMs to locate the requested information. A list or summary of all available data responsive to the request is then transmitted to the user via the local SRU. The user may then update or modify the request to create an abbreviated list of video clips and/or other data the user wishes to view.

The abbreviated user query is then passed to the PIM. The PIM, having previously located each requested video clip on other remote IMs, retrieves the requested video clips and displays them at the user's terminal by creating a DSI for each user that requests video clips that are not stored at the local SRU, and informing the DSI where the requested video clips are stored. The DSI collects the requested video clips from the appropriate extended and remote SRUs and transmits this information to the local SRUs.

The requested video clips satisfying the user query are then displayed at the user's terminal. The user may display, copy, and/or save or print the results. Copies can also be made on standard video cassettes. In a preferred embodiment, the DSI has the capability of resequencing the transmission order of video clips to further manage the demands on the system. For example, requested video data may be stored and retrieved at various locations throughout the system, at various distances from the user, and accessible through different networks or communications routes, with different bandwidths and transmission speeds. In a preferred embodiment, the DSI determines the most appropriate routes and schedules for downloading requested information, to provide fast and efficient service to the user without unduly taxing the shared components of the system.

The PIM records how often particular video clips are requested, and from this information determines whether those clips should be duplicated at particular local SRUs for ready display. As video clips are updated or eliminated, the PIM makes the required updates to the database log. Also, the PIM keeps track of billing information for the users of the system.

The system may offer secondary audio visual information which would correspond to the requested video clips. In an illustrative application within the real estate industry, the secondary audio visual information could be the schools, shopping centers, and hospitals situated in the vicinity of a requested property. The secondary videos are related to the primary audio-visual data or video clips through a coordinate system to minimize data entry, data storage, and the demands on the system's computational resources.

Certain advanced embodiments also allows the user to perform "what if" alterations of the downloaded information, for example, allowing the user to show a potential buyer what a listed house would look like with a porch addition.

BRIEF DESCRIPTION OF THE DRAWINGS

The features of the invention will be more readily apparent from the following detailed description and drawings of an illustrative embodiment of the invention in which.

DETAILED DESCRIPTION OF THE INVENTION

Figure 1:
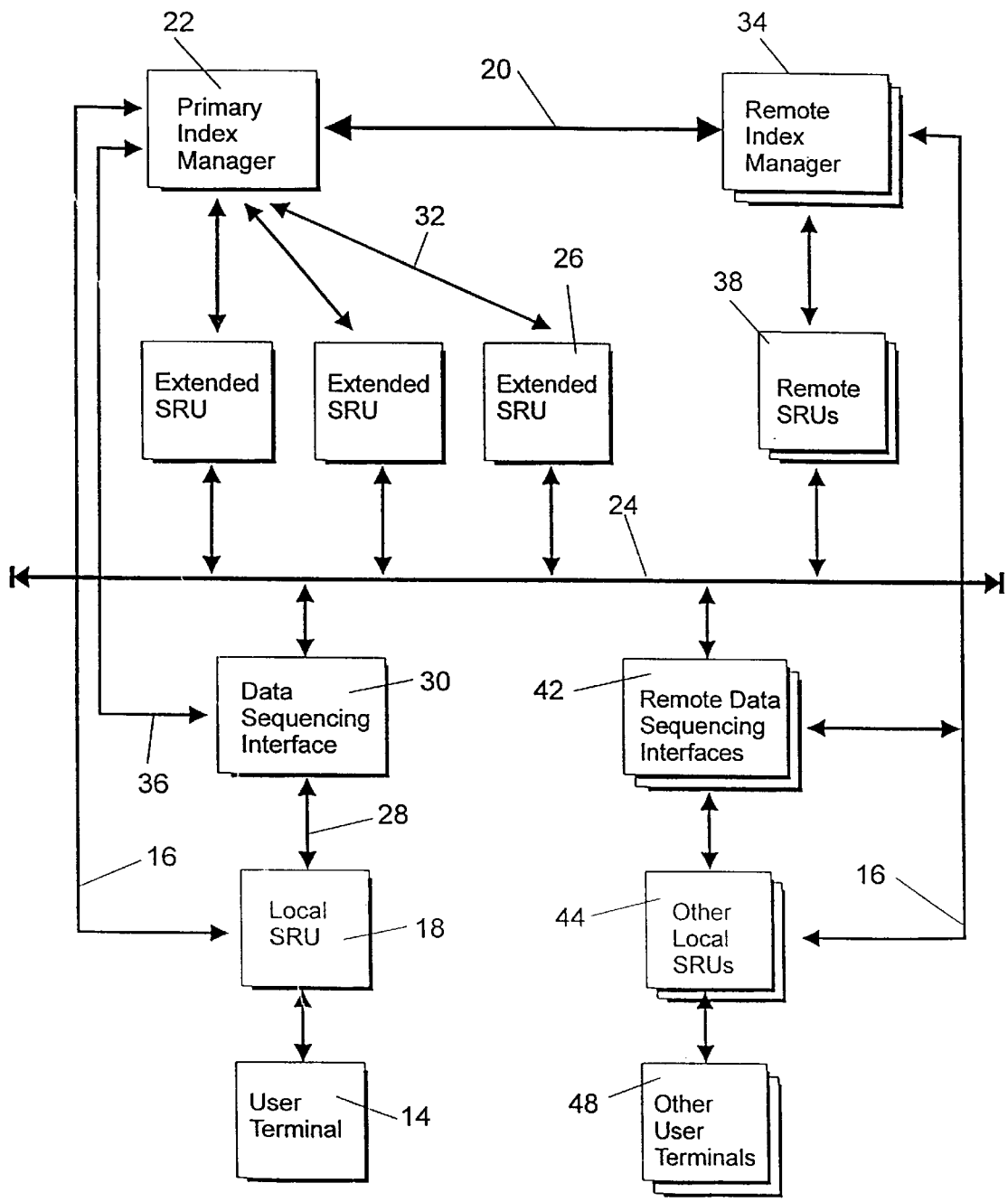
FIG. 1 is a block diagram showing a preferred hierarchy of the system.

FIG. 1 illustrates a preferred embodiment of the video clip storage and retrieval system, showing its structural hierarchy and the various modules which comprise the system. As shown, the system comprises one or more user multimedia terminals 14, a local storage and retrieval module or unit ("local SRU") 18, a data sequencing interface (DSI) 30, one or more extended storage and retrieval modules or units ("extended SRUs") 26, and one or more index managers ("IM") 22.

By way of a system overview, video clips are stored primarily on extended SRUs 26, and are tracked and distributed by the IMs 22. A user obtains videos of interest by communicating with a primary index manager ("PIM") 22 via a local SRU 18. The PIM 22 locates the requested video clips and creates a DSI 30 to direct the efficient download of the video clips to the user terminal 14. The connections between terminal 14 and the local SRU 18 can be within the same computer, or between two or more computers located within a building, which are linked together on a local area network.

Exemplary software modules comprising each component of the system, and databases associated with each software module, are depicted in Table 1, below. Preferred and non-limiting embodiments of each module of the system are also described below, with reference to FIG. 1 and Table 1.

TABLE 1

SOFTWARE MODULES & DATABASE PARTITIONING

| SOFTWARE MODULES | DATABASE PARTITIONS |
| --- | --- |
| INDEX MANAGER | INDEX MANAGER |
| IM Supervisory Process | Text Database |
| Text Database Management Logic | IM List |
| Storage Management Logic | SRU List |
| Message Routing Logic | Audio-Visual Data Index |
| DSI & SRU Command Logic | Audio-Visual Access List |
| DATA SEQUENCING INTERFACE | |
| DSI Process | |
| Audio-Visual Sequencing Logic | |
| Index Manager Interface | |
| Extended SRU Interface | |
| Local SRU Interface | |
| EXTENDED STORAGE & RETRIEVAL UNIT | EXTENDED STORAGE & RETRIEVAL UNIT |
| SRU Process | Active A/V Listings |
| IM Command Interface | Inactive A/V Listings |
| DSI Command Interface | Secondary A/V Listings |
|  | Remote A/V Listings |
| LOCAL STORAGE & RETRIEVAL UNIT | LOCAL STORAGE & RETRIEVAL UNIT |
| Regional Identifier Builder | Local A/V Data Index |
| Audio-Visual Download Interface | Actual A/V Data |
| Compression/Decompression | |

User Terminal

Terminal 14 is the user's interface to the system, and typically is a personal computer, workstation, or a television set top box. Terminal 14 is connected to or includes the local SRU 18, and sends the user's requests to the PIM 22, after initial interrogation of local SRU 18. As shown in FIG. 1, terminal 14 communicates with a PIM 22 to obtain requested audio-visual data, wherever the requested data is stored, e.g. on extended SRUs 26 or remote SRUs 38, and on different systems or networks at different communication and/or phone system addresses. Terminal 14 receives or downloads requested audio-visual information through the local SRU 18.

As shown in Table 1, each user terminal 14 comprises a search or query interface, an audio-visual display interface, and audio-visual data decompression logic. The query and display interface provides the user access to a database or index which can be interrogated for desired video clips and other information. For example, in a real estate application, one such database could be the Multiple Listing Service (MLS).

The Audio-Visual Display logic provides a mechanism for the user to manipulate retrieved video clips. After requested video clips have been displayed on the user's terminal 14, the user may then interact with the system using, for example, a play, stop, pause, fast forward, fast reverse, forward and reverse metaphor. The user may elect to "jump" to specified locations within the clip, the locations being tabulated in a window on the user's terminal 14. Also, displayed in another window on the user's screen may be a list of available secondary options for user interaction.

In a preferred embodiment, videos are stored and moved through the system in a highly compressed state and will be decompressed at the users terminal 14. The decompression logic utilized may be commercially available video decompression standards and protocols, for example, Motion Picture Experts Group ("MPEG") standards 1 and 2, MJPEG, Indio, or Fractal.

Local Search and Retrieval Unit (Local SRU)

The local SRU 18 is the temporary storage location for video clips and for information downloaded from the extended and/or remote SRUs 26 and 38, for use at user terminal 14. As shown in FIG. 1, user terminal 14 and local SRU 18 may be combined as one computing system. In a preferred embodiment, the local SRU 18 is connected to one or more user terminals 14, each local SRU 18 being capable of supporting a large number of user terminals 14. For example, the local SRU 18 may comprise a file server for a local area network, with one or more integral or connected storage devices. In such an embodiment, each terminal 14 interacts with the local SRU 18 via a network connection, e.g. as a network node, using conventional network protocols and topologies.

Suitable storage media for use in a local SRU 18 include large capacity hard drives, such as 1, 2 or 5 gigabyte hard drives, high speed optical drives, RAID devices, and other media capable of storing locally a reasonable complement of video clips for ready access and manipulation. Portions of the local SRU's 18 disk storage capacity are designated as the storage capacity required to duplicate a subset of the primary and remote IM(s) audio-video data index databases. This information is used during terminal queries to determine which video clips are stored locally. Video segment revision information is also maintained within the index database, and is returned to the IM during the query process in order to maintain video segment accuracy. In the event that additional storage space is required, additional disk storage may be provided to the local SRU, to include storage capacity for active, inactive, and secondary audiovisual listings.

Apart from storing audio-visual data, the local SRU 18 comprises local search and update logic, a regional identifier builder, an audio-visual data download interface, and (6) compression/decompression logic (Table 1).

The Regional Identifier Builder component of local SRU 18 attaches a regional code or identifier to each user request. The regional identifier allows the PIM 22 to communicate with specified remote IMs 34, and to determine the locations of requested video clips stored at remote SRUs 38. In a preferred real estate embodiment, the regional identifier may be the ZIP code of the property in the video segment. This information may be taken directly from the text database.

It will be apparent, however, that the (Regional ID) field can be keyed to any convenient category or context-sensitive description suitable for the type of information stored and the desired end use.

Local SRU 18 transmits downloaded video clips to the user terminal 14 in a highly compressed state. In a preferred embodiment of the invention, this operation is mediated by an Audio-visual Download Interface associated with local SRU 18 (Table 1), with decompression prior to and/or in "real-time" during viewing occurring at the user terminal 14. Local SRU 18, via its download interface, also communicates with a DSI 30, described in more detail below. DSI 30 manages the download of video clips and other information to local SRU 18 from the various locations where responsive information is found.

The local search and update logic serves primarily two functions. First, it enables local SRU 18 to search its storage media for requested video clips before the query is transmitted to the PIM 22. The update logic allows the PIM 22 to identify whether the locally available video clip is current. Thus, when the user's request is transmitted to the PIM 22, the request is modified to indicate (1) whether the video segment is stored locally, and (2) the current Revision Code associated with the video clip. If the PIM 22 locates a clip that supersedes the one currently stored on the local SRU 18, the local SRU 18 is notified, the old data is deleted, and the new data is downloaded from the SRU 26 containing the updated video clip.

A second function of the local search and update logic is to identify and track the most frequently requested audio-visual clips. These video clips are identified for continued storage within the local SRU 18. This ensures that once a predetermined local SRU storage capacity is reached, only the most heavily used video clips are stored at the local SRU 18. In one embodiment of the invention, when a video clip with higher usage than the least used locally stored clip is identified, the least used clip is replaced by the higher usage clip within local SRU 18. In another embodiment, local SRU 18 may store the last requested video clips, space permitting. A combination of these and other storage swapping and management approaches may be used.

In a preferred embodiment, DSI 30 transmits information in compressed form to local SRUs 18 for downloading to the user's terminal 14. The decompression is performed at the user terminal 14 using conventional decompression standards. However, where the user is using a television screen, or other unintelligent device, to receive the audiovisual data, the decompression, via commercially available decompression standards (discussed above) will take place at the local SRU 18.

Primary Index Manager

The PIM 22 is the primary search engine and database management module of the invention. As shown in Table 1, PIM 22 comprises (a) index manager supervisory process; (b) text database management logic; (c) storage management logic; (d) message routing logic; and (e) DSI & extended SRU command logic. The PIM 22 is designed so that no two functions must specifically reside on the same physical computer, although it will be apparent that in preferred embodiments certain functions may be conveniently or efficiently grouped together conceptually and/or physically, for greater ease of use.

The "index manager supervisory process" (Table 1) is the software interface to the high speed communication interface (explained below). It provides the communication interface to the local SRUs 18 and to the text databases. When the user's query necessitates creating a DSI 30, the "index manager supervisory process" creates a DSI 30 on its computer system unless the "index manager supervisory process" determines that the current state of high speed communications on its computer exceeds a predetermined limit, for example, 40–80 users. In that event, the DSI 30 is created on a different computer system.

The "text database management logic" is incorporated from the text database in use with the system, and manages and controls text data stored within these databases. For example, in a preferred embodiment, the "text database management logic" is the logic associated with the Multiple Listing Service ("MLS") database, and is structured to allow MLS queries spanning the entire distributed network.

The "storage management logic" is the system "storage engine" and is responsible for placing new and/or updated or uploaded audio-visual data on the most appropriate extended SRU 26. Audio-visual segments or clips can be stored to more than one extended SRU 26, when duplication would minimize traffic to and from local SRUs 18, for example over high speed network 24 or communication line 16. The decision to move or copy data to an extended SRU 26 from a remote IM 34 and SRU 28, or from another extended SRU 26, is made for example by evaluating an algorithm which accounts for available storage space on the various SRUs 26, the demand for particular video clips, and the locations of users requesting the most popular videos. The "storage management logic" may also track parameters such as the cost of transmitting and storing duplicate information, and helps to ensure that each extended SRU 26 is utilized efficiently, and that no extended SRU 26 becomes "overextended."

The index manager "message routing logic" accepts regionalized queries from the local SRU 18, deciphers the queries, and subsequently forwards the disassembled queries to remote IMs 34. The index manager "message routing logic" also accepts the responses received from the remote IMs 34, formulates a comprehensive response, and relays this response to the user.

The "DSI and SRU command logic" provides the IM 22 with the capability of directly communicating and controlling the DSIs 30 and the SRUs 26. The PIM 22 uses this interface to pass the data required to enable the DSI 30 to communicate with the extended and remote SRUs 26 and 38 to direct these SRUs to download video information.

The "SRU Command logic" sees to the duplication of popular videos on alternate SRUs 26. It also places copies of video segments on SRUs geographically closer to the users most interested in those videos. The goal is not duplicate data onto SRUs 26 where the number of frequently downloaded videos ("FDVs") is already high (above a predetermined value). Duplication of data is performed according to the following logic during non-peak periods of system operation. The PIM 22 determines whether it is managing an extended SRU 26 which has an FDV level above this predetermined value. This determination is made by searching through the "Audio-Visual Data Index" database (described below) to identify the video clips that have been accessed most frequently. From this video subset, videos are selected for transferal or duplication based on where the video was used most. If the FDV was transferred principally from DSls 30 created by the PIM 22, extended SRUs 26 located within the same computer are evaluated to determine whether that extended SRU 26 can accept a duplicate copy of the video clip. If so, the FDV is duplicated on the identified extended SRU 26.

Extended Storage and Retrieval Unit (Extended SRU)

As noted above, extended SRU 26 is the principle storage facility for the system and is used to store audio-visual data in a plurality of audio-visual storage media. Although this section refers primarily to the extended SRU 26, the term includes remote SRUs 38 which may also store requested audio-visual information. The software modules are identical.

The most requested audiovisual data, to include the FDVs, are written in contiguous allocation blocks closest to the system's disk storage allocation table. Inactive video segments are stored in contiguous allocation blocks furthest away from the "disk storage allocation table." In an alternative configuration, the disk storage allocation table is maintained in RAM or on a separate computer. Disk storage is organized in macro storage cells which insure that each video segment will always be stored in contiguous allocation blocks. This may be achieved, for example, by using a storage cell capable of storing a two minute audiovisual segment.

Referring to FIG. 1, one or more extended SRUs 26 are connected to the PIM 22 and to each terminal-unique DSI 30, in the event that the PIM 22 determines that a DSI 30 should be created. The extended SRUs 26, upon direction of a DSI 30, transmit requested data, via the DSI 30, to an appropriate local SRU 18, and ultimately to user terminal 14.

The extended SRU 26 comprises an SRU supervisory process, an IM command interface, and a DSI command interface. The SRU supervisory process enables the extended SRU 26 to communicate directly with the IMs 22 and DSIs 30. This interface responds to messages and data packets addressed to it. It also encapsulates, for network transmission purposes, video data to be transmitted to other SRUs 26 or DSIs 30. The SRU supervisory process allows the SRU 26 to store data transferred to it. Similarly, the SRU supervisory process can delete all out of date or unnecessarily duplicated data. This storage and deletion of data are performed under the direction of the PIM 22 via the "IM Command Interface."

The "DSI command interfaces" exist to allow the PIM 22 to function apart from the extended SRUs 26. The DSI command interface is provided to direct the extended SRU 26 to download the audio-visual information to the DSI 30 transmit buffers for eventual download to the user terminal 14.

Data Sequencing Interface (DSI)

According to the invention, each DSI 30 is created by the PIM 22 to facilitate data transfer from the extended and remote SRUs 26 and 38 to the user terminal 14. When created, the DSI 30 may reside within the extended or local components of the system, but in the preferred embodiment of FIG. 1 is shown locally. The DSI 30 collects, manages, and buffers data which is transmitted from both extended SRUs 26 and remote SRUs 38 to the local SRU 18, and then downloaded to the user's terminal 14.

A DSI 30 is created and/or initialized by PIM 22 whenever a user requests audiovisual information that is not stored within the local SRU. In a preferred embodiment, the DSI 30 is created just prior to the video data download process, and destroyed immediately thereafter. This allows the system to use one communication network for querying and another, preferably higher bandwidth, communication network for video data downloads. For example, the D channel ("X.25 packet" network) of an "integrated services digital network" ("ISDN") connection may carry the video querying traffic of the video network, to include forwarding the user query to the PIM 22, and receiving the response from the PIM 22. Once the user has finally determined which video clips are to be retrieved, the PIM 22 identifies the most appropriate and efficient location for the DSI 30 and then creates the DSI 30 at this location. A detailed "DSI Video Download List" is then passed to the DSI 30 by the PIM 22. The DSI 30 uses this list to direct the SRUs to download the requested information.

Also, the DSI 30 allows the network to connect many geographically distributed video data sources to one subscriber destination.

DSI 30 comprises (1) a DSI supervisory process, (2) audio-visual sequencing logic, (3) a PIM interface, (4) an extended SRU interface, and (5) a local SRU interface.

The DSI supervisory process enables the DSI 30 to communicate directly with the PIM 22, the extended and remote SRUs 26 and 38, and the local SRUs 18.

Figure 2:
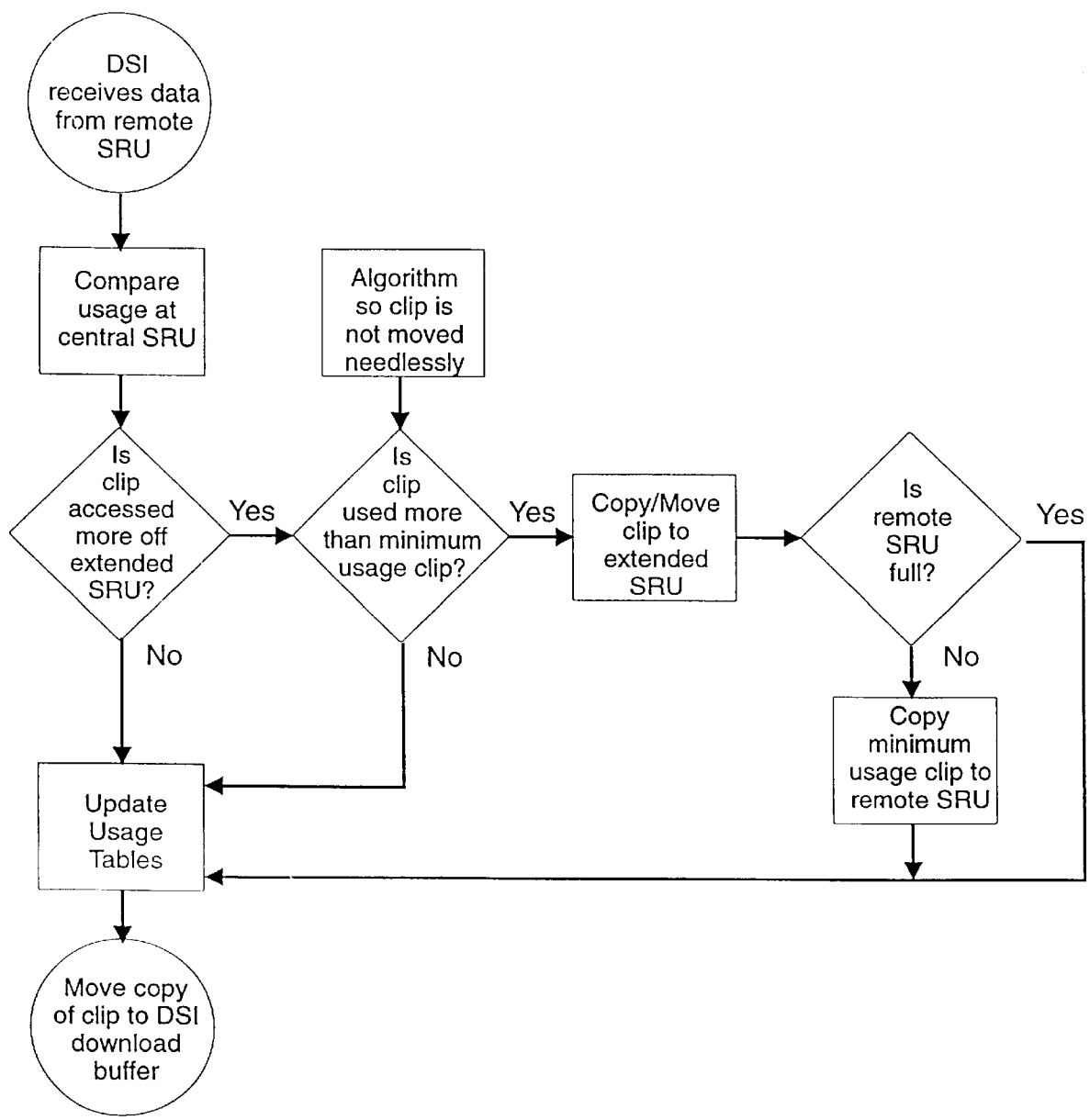
FIG. 2 is a block diagram illustrating how various modules of the video clip retrieval system may be addressed.

The "audio-visual sequencing logic" for DSI 30 operates broadly as shown in FIG. 2. The "audio-visual sequencing logic" enables DSI 30 to resequence data, to provide for more efficient use of the storage and retrieval units. The object is to allow the system to utilize idle resources throughout the network. The DSI 30 actively determines which computing systems and communication paths to the user should be used for each download. Thus, if a particular extended SRU 26 is busy supporting other users, the PIM 22 may create a remote DSI 42 on a remote system for user terminal 14. Remote DSI 42 would then communicate with user terminal 14, assume responsibility for the download process, and direct the video data download to user terminal 14.

The "index manager interface" provides (1) the command interface between the PIM 22 and the DSI 30, and (2) the feedback mechanism between the DSI 30 and the PIM 22. In the first instance, the PIM 22 uses the "index manager interface" to communicate instructions to the DSI 30 in order for the DSI 30 to collect the requested video information. In the second instance, the DSI 30 reports back to the PIM 22, informing the PIM 22 of the status of each queried extended SRU 26.

The "extended SRU interface" allows the DSI 30 to direct the identified extended SRUs 26 to download requested information to DSI 30 transmit buffers, for download to the user terminal 14. This interface is typically a very high speed interface, for example, FDDI or "FireWire."

The DSI 30, uses the local SRU interface to coordinate its video segment download with the local SRUs 18. The communication interface between the DSI 30 and the local SRU 18 is typically a high speed interface, for example, ISDN. Also, when the traffic around the PIM 22 is high, the DSI command logic establishes, via the local SRU interface, a remote connection with a local SRU 18 (discussed above).

Database Structures

The system may employ relational or flat-file databases, text indexes and/or search engines, and raw data in the form of audio-visual clips and/or text information. Field-oriented databases may be used in the system, and in representing such databases each field can be shown enclosed by parentheses. For example, (Field 1), (Field 2) represents a database with data fields 1 and 2. If the database is related to another database, the relating field can be denoted with square brackets ([]). Thus, in the following example, Database 2 is related to Database 1 through field 3.

Database 1: (Field 1), (Field 2), [Field]
Database 2: [Field 3], (Field 4), (Field 5)

In the present invention, the PIM 22 software is designed to contain the following database structures: (1) a Text database; (2) an IM list; (3) an SRU list; (4) an Audio-visual data index; and (5) an Audio-visual Access list.

In an illustrative embodiment of the invention, the user, via the PIM 22, has access to at least one "text database" containing records with searchable fields, one of which is [Video ID]. Each record in this database corresponds to a video clip stored on the extended or remote SRU 26 or 38. This database may be maintained by the system or by one or more third party databases, for example, the Multiple Listing Service (MLS) database, and using any suitable data management "front-end."

The "IM list" (Table 1) is a hierarchical database storing information needed to target specific databases during data queries, and serves to identify remote IMs 34 containing requested audio-visual data. The "IM list" is structured as follows:

(IM Address), [Regional ID], (Alternate Address).

Because regional data may span multiple remote IMs 34, there may be multiple remote IM entries in the PIM list database. The (IM Address) helps locate the appropriate remote IM 34 within the network. The [Regional ID] allows the PIM 22 to communicate with remote IMs 34 identified as containing information relating to the requested regional identifier. This reduces the number of servers contacted, thereby reducing messaging that occurs over the high speed network 20. The regional ID is obtained during construction of the query by the local SRU 18 software modules. In certain embodiments of the invention, (Alternate Address) field is a system phone number, electronic address, or other path to the remote IM 34 in the event that other third-party database providers are used.

The "SRU list" is structured as follows:

(SRU Address), (SRU Under-run Count Rate), (SRU Access Count Rate).

The (SRU Under-run Count Rate) is used to track the number of times during a predetermined period, for example, a 24 hour period, that the extended SRU 26 or remote SRU 38 were not able to fulfill data requests because the SRUs were busy downloading data to fulfill other data requests. The (SRU Under-run Count Rate) will be explained below in the SRU monitoring discussion. The (SRU Access Count Rate) monitors how often during a predetermined time interval, a particular SRU is used for video delivery.

The "audio-visual data index" identifies each video clip and specifies its location. The "audio-visual data index" is structured as follows:

[Video ID], (SRU Address), (Location Code), (Revision Code), (Initial Copy Flag), (Usage Count Rate),

[Secondary Array ID]

As above, the [Video ID] is a unique reference identifier for each video clip and corresponds to an identifying field within the text database. The (SRU Address) identifies the network location of the SRU containing the requested audio-visual information. The (Location Code) is the exact physical location of the video clip within the SRU. The (Revision Code) indicates whether this version of the video clip is the current version. The (Initial Copy Flag) is a field that is appended to each new video clip entry, so that the system knows that this version may only be updated, duplicated, or removed to more remote storage locations, but not deleted from the database entirely. The (Usage Count Rate) keeps track of how often a particular video clip is requested during a predetermined time interval, for example, a 24 hour period. This information is used to determine FDV status. The [Secondary Array ID] is used to point to a "related" database of secondary or related video or text information (not shown).

Thus, in a preferred embodiment where secondary information is provided, the user may enhance the available text and audio-visual data by providing additional information about the requested data. For example, in a preferred embodiment directed towards the real estate application, the secondary database may contain audio-visual information about hospitals, schools, and traffic patterns, etc. associated with any requested property video.

In the real estate example, the secondary database may be organized as follows:

[Secondary Array ID], (Segment Coordinate)

The [Secondary Array ID] provides a way for the PIM 22 to flag were additional secondary data is available. The (Segment Coordinate) indicates the geographic area corresponding to the secondary information. The boundaries of this geographic area may be represented by latitude and longitude coordinates either taken from a map or, preferably, taken by GPS. Because the geographic area would typically encompass multiple property listings, each entry in the secondary database would correspond to several video clip entries.

The "audio-visual access list" is comprised of the following fields:

[Video ID], (IM Address), (Access Rate)

This database maintains a list of DSI 30 supporting "computer systems," by virtue of the managing or nearest IM address to which audio-visual information was delivered. The DSI 30 requests data from many SRUs. When a DSI has successfully collected data from a particular SRU, its managing IM's "audio-visual access list" database is updated to reflect that video segment delivery to that physical location within the network. The network now has information representing the destinations of specific video segments from specific SRUs. This information is used to determine the most meaningful destination for videos and/or copies of videos distributed by the network storage management logic.

Apart from providing the primary storage location for the video clips, the extended SRU 26 comprises an "active A/V listing," and "inactive A/V listing," a "secondary A/V listing," and a "remote A/V listing." The purpose for each of these listings will be explained in relation to a real estate application. In the real estate context, new property listings are typically of greater interest to the user and, therefore, would comprise the "active A/V listing." Older property listings would not be selected as frequently and would comprise the "inactive A/V listing." However, a change in the property status, for example, reducing the price of the property may return the property to the "active A/V listing." The "secondary A/V listing" would comprise the secondary information associated with certain video clips. The "remote A/V listing" would typically comprise property that has already been sold. This information would still be useful for comparative pricing purposes, but would be accessed relatively infrequently.

The audio-visual data stored on the extended SRU 26 is the video clip itself. In a preferred embodiment of the invention, video data is stored on the extended SRU 26 in storage blocks equivalent to approximately two (2) minutes of audio-visual data. The actual length of these storage blocks varies and is dependent upon the video delivery application. Audio data is also stored on the SRU in blocks of similar length. The entire audio and video segment may be stored contiguously, with the video and audio data being stored either separately or together.

The local SRU contains a "local audio-visual index" and "actual audio-visual data." Audio-visual data stored on the local SRU 18 is organized in the same manner as the data stored on the extended SRU 26. The "local audio-visual index" comprises the following data fields:

[Video ID], (Location Code), (Revision Code)

The [Video ID] corresponds to a field in the text database, and identifies the video clip. The (Location Code) specifies the exact storage location of the video clip within the local SRU 18. The (Revision Code) indicates whether the stored version of the video clip is current.

When the DSI 30 is created, the PIM 22 transmits a data structure that identifies the requested video clips, and the exact locations of each video clip. The data structure is as follows:

[Video ID], (IM Address), (SRU Address), (Location Code), (SRU Access Count Rate), (SRU Under-run Count Rate)

The [Video ID], (IM Address), (SRU Address), (SRU Access Count Rate), and (SRU Under-run Count Rate) serve the same functions as previously described. The [Video ID] field is the principle field, with the remaining fields being supporting fields to the [Video ID] field. The (Location Code)

is the precise video storage address within the SRU. Since it is possible for each video segment corresponding to a unique [Video ID] to have multiple unique storage locations, the DSI 30 may have multiple records for separate storage locations for that video segment within the DSI's video data download structure. Thus, if one SRU cannot respond to the DSIs command because it is busy downloading audio-visual information to fulfill another request, then the DSI 30 simply retrieves the requested video clip from another location.

Storing a Video Clip

When a new video clip is received, the PIM 22 must first determine which extended or remote SRU 26 or 38 will store the audio-visual information. The PIM 22 identifies the IMs 34 supporting that video segment's region by comparing the regional identifiers. The PIM 22 then checks to see whether these SRUs have available FDV storage. This is because most new video clip listings will fall into the FDV category. If sufficient FDV storage is found, the video clip is stored on that SRU (26 or 38), and the supervising IM's (22 or 34) A/V Data Index database is updated. However, if no suitable storage is found, the PIM 22 will determine the SRU with the lowest FDV allocation and store the video to that SRU.

A video clip is stored as follows: (1) A video is transmitted to an SRU 26 for storage; (2) the "SRU supervisory process" writes the information to the disk and returns the storage location of the data to the PIM 22 (the format of the storage location message is dependent on the type of file: UNIX, DOS, etc); and (3) the PIM 22 writes the video clip's storage address into "A/V data index" database on the PIM 22.

Retrieving a Video Clip

Figure 3:
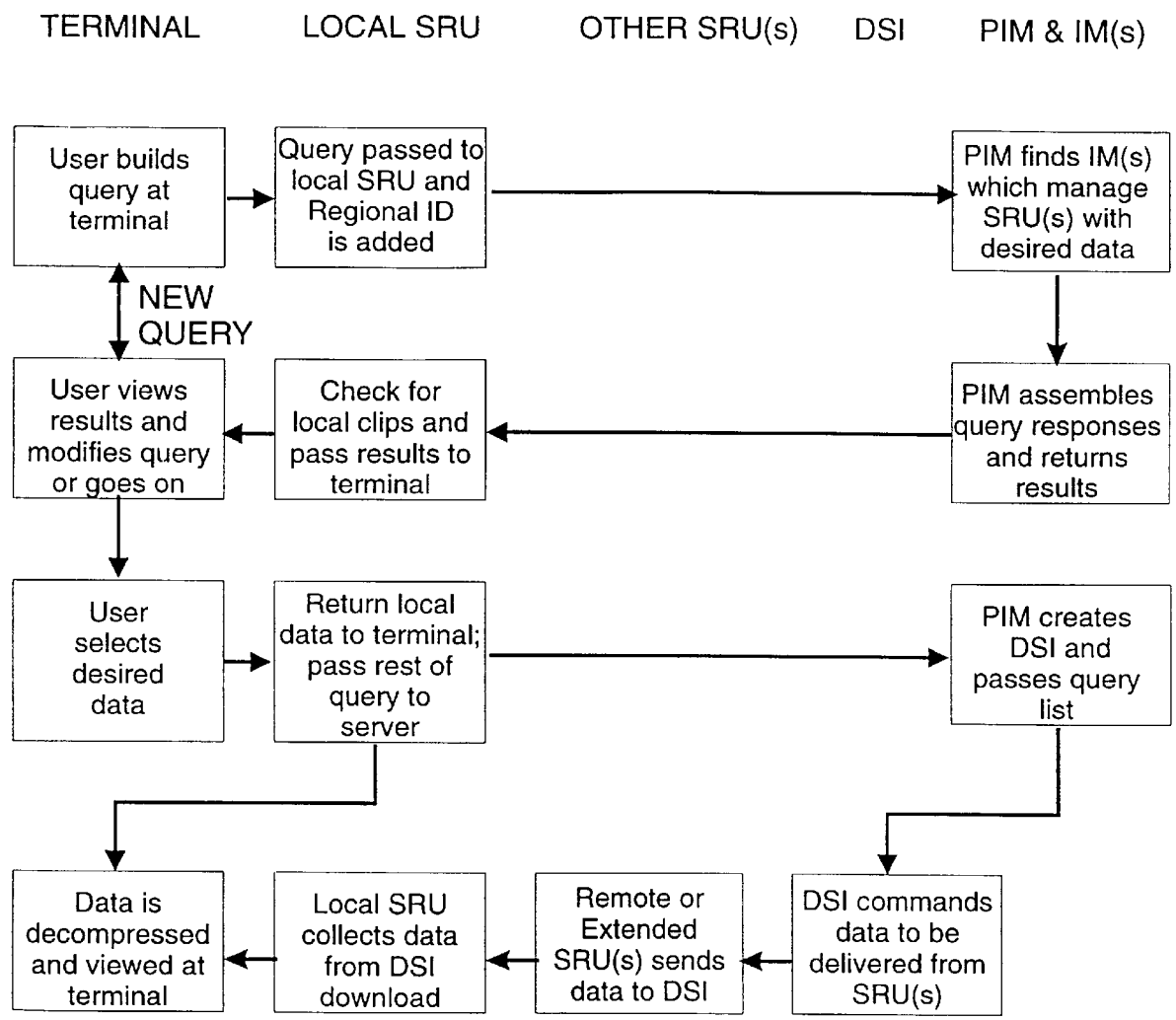
FIG. 3 is a flow chart illustrating data sequencing interface logic for video clip storage management.

FIG. 3 provides a summary of how a preferred embodiment of the invention would operate to search and download data. The user first builds a data query at the user terminal 14 from the text database. For example, in the real estate application, the user would specify a selected property criteria from the MLS. Once constructed, the query is transmitted to the PIM 22 via a local SRU 18. The local SRU 18 modifies the query in the following ways: (1) attaches a regional identifier to the query; and (2) searches its own database and flags each request that is stored at the local SRU 18 by appending a Revision Code to the request. The audio-visual data index also specifies the exact locations of the audio-visual data stored at the extended SRUs 26 and, via the remote IMs 34, the locations of video data stored that the remote SRUs 38. The PIM 22 uses the regional identifier to identify which remote IMs 34 contain the requested video segments. Each identified remote IM 34 processes the query, returning a list or summary of available audio-visual references to the PIM 22. The PIM 22 also uses the Revision Code to determine whether the video segment stored at the local SRU 18 is the most current copy available. The PIM 22 subsequently downloads a list of all available video clips to the user's terminal 14, indicating which video clips are immediately available by virtue of the fact that a current copy of the video segment is stored at the local SRU 18.

Using the list of matching database records and audio-visual references, the user identifies and selects individual records or groups of records for further viewing and manipulation. This abbreviated list is transmitted to the PIM 22. The PIM 22 creates a DSI 30 and communicates the exact storage location of each requested video clip to the DSI. The DSI 30, in sequential fashion, queries each extended SRU 26 and remote SRU (if applicable) communicating the exact video clip location to the SRU. The DSI 30 may have multiple address locations for each requested video clip, some locations being on the extended SRUs 26 and other locations being on remote SRUs 38. The DSI 30 will first attempt to collect the video clips from the extended SRUs 26 before attempting to retrieve similar information from the remote SRUs 38. The affected SRUs downloads the requested data to the transmit buffers of the DSI 30, where a predetermined number of video clips may be stored in RAM until the local SRU 18 is ready to receive the information. The DSI 30 updates the SRU access counter and transmits this information to the PIM 22 for use in monitoring demands on the SRUs. Once the data has been received by the local SRU 18, the local SRU 18 downloads the video clips to the user terminal 14.

In the event that the queried SRU is presently busy delivering data, the DSI 30 may either use the alternate video address to attempt to retrieve the requested video clip from another SRU, or else moves on to retrieve the next requested video segment. Whenever an SRU fails to deliver the requested video clip, the DSI 30 increments the SRU under-run counter for that SRU and eventually communicates this information to the PIM 22. If the SRU under-run count exceeds a predetermined threshold value (communicated to the DSI 30 upon creation), the PIM 22 directs further requests away from this affected SRU by having the DSI 30 query alternate SRUs for the video clip information. In the event that the video clip is only stored at this location, then a delay will be encountered as the DSI 30 waits for the video information to be downloaded. The PIM 22 will also direct that the number of FDVs be decremented for this affected extended SRU 26.

In addition, since the SRU under-run count parameter identifies the location of "over-accessed" SRUs, audio-visual data will be moved or copied from these heavily loaded SRUs to more lightly loaded SRUs (based on their under-run levels), in an effort to distribute or flatten SRU demand. This load management process will occur during off-peak hours. The SRUs selected for copies or transferal of data will be identified from video usage information obtained from the "Audio-Visual Access List" located on the PIM 22.

Data is preferably (1) maintained on the extended SRUs 26 which are most often queried for that data, (2) duplicated on local SRUs 18 which most often request the data, or (3) may be duplicated on other remote SRUs 38 as space allows. This supply and demand approach, mediated by PIM 22 in response to DSI monitoring inputs, provides fast access to the most requested information and efficient storage with a maximum of useful redundancy without waste or loss of performance. Alternatively, the network may also be configured to always store each audio-visual entry in at least one other location (space providing). This redundancy introduces improved throughput and offers improved reliability.

Communication Interfaces

In a preferred embodiment, as shown in FIG. 1, the system provides a plurality of extended SRUs, each of which communicates with the Primary Index Manager (PIM) 22 and the Data Sequencing Interface (DSI) 30. This provides a flexible, high capacity, high throughput system which can be readily expanded as needed, and can provide for efficient distribution and backup of video clips and other data on the system. Also as illustrated in FIG. 1, the video clip system may communicate with other systems, for accessing video clips or other data stored at remote locations.

Communication between the PIM 22 and the remote index managers (IMs) 34 is primarily concerned with queries and results of queries, and is facilitated in a preferred embodiment by a very high speed network 20, for example, the Fiber Distributed Data Interface ("FDDI") which approaches speeds of 100 megabits per second. The PIM 22 communicates with the extended SRUs 26 via a similar very high speed network 32 where the extended SRUs 26 are located on the same computer as the PIM 22. Alternatively, other networks may be used, for example a very high speed ATM network in embodiments where the extended SRUs 26 are distributed in a wide area network (WAN) configuration. The PIM 22 further communicates with the local SRU 18 via a high speed network 16, such as ISDN. Whenever a DSI 30 is created, PIM 22 communicates with the DSI 30 via network 36, and like PIM 22 communication with extended SRUs 26, is via a very high speed interface (for example, FDDI, FireWire, or ATM).

Communications between the extended or remote SRUs 26 or 38 and the DSI 30 are via a very high speed interface 24, for example, FDDI. This communication interface supports the throughput of vast amounts of audio-visual data. In contrast, the communication interface 28 between the DSI 30 and the local SRU 18 is less demanding, and may be via a high speed (ISDN) interface. It is preferable that the communication interface 28 between the DSI 30 and the local SRU 18 be at least 56 KBAUD to support the "real time" video requirements of approximately 15 f.p.s. Typically, the local SRU 18 and the user terminal 14 are located in the same computer providing for a very high speed communications interface.

The remote IMs 34 are linked to their own extended SRUs, shown as remote SRUs 38 in FIG. 1. Remote SRUs 38 communicate with remote DSIs 42, other local SRUs 44, and other user terminals 48 according to the same flexible hierarchy as the extended and local design described above.

EXAMPLES

Representative non-limiting examples of the invention follow, and illustrate how the invention can advantageously be used. It will be readily apparent that, in addition to these examples numerous other applications of the video clip retrieval system are possible and are within the scope of the invention.

Example 1

Real Estate

In a preferred embodiment of the invention for use with real estate data, the user would use a property database like the Multiple Listing Service as the primary text database, to determine the properties the user wishes to investigate. The user formulates an initial search query which is transmitted to the local SRU 18. The local SRU attaches the Regional ID to the query, which, in this application, may be the ZIP code(s), map, Cartesian, or GPS coordinate(s) associated with the requested properties. The local SRU 18 also searches its own storage facilities to determine whether the requested video clips are stored locally and, if so, attaches a Revision Code to available video clips. This enhanced query is transmitted to the PIM 22. The PIM 22 (1) updates the video clip usage tables; (2) uses the Regional ID to efficiently determine from among many remote IMs 34, which remote IM 34 has any information relevant to the enhanced query; and (3) uses the Revision Code to determine whether the locally available video clip is up-to-date. A list of available video clips is transmitted to the user. The user may then choose the video clips the user desires to view. This request is retransmitted to the PIM 22 via the local SRU 18. The PIM 22 creates a DSI 30, indicating to the DSI 30 where the requested video clips reside. The DSI 30 directs the extended SRUs 26 to download the video clips into the DSI 30 transmit buffers. The video clips are transmitted to the local SRU 18, and are subsequently displayed at the user terminal 14.

In this illustrative application, any available secondary video may be cataloged according to the geographical region it supports. A list of secondary videos may be displayed in a "Secondary Video" window on the subscriber's terminal whenever the property video is viewed. When the user requests the secondary video, this request is transmitted to the PIM 22. The PIM 22 has already determined the location of the secondary video information. The PIM 22 either uses the previously created DSI 30 or it creates another DSI 30 and passes the location of the secondary videos to the DSI 30. The DSI 30 then directs the SRUs containing the secondary video information to download this information.

In a further embodiment of the invention, the property's coordinates are obtained from previously established map data. In another embodiment, the longitude and latitude of each property is obtained using a Global Positioning System (GPS) system, for example when the property is being filmed, and may be recorded along with the property's corresponding text data.

Example 2

Prescription Drug Information

Another application of the invention is directed towards providing online drug prescription information to physicians. Traditionally, pharmaceutical companies have utilized very expensive detail forces to physically meet with physicians to educate them about proprietary medications. However, recently, with the tremendous downward pressure on prescription pricing, the rapidly rising costs of drug discovery and development, the speed of reverse engineering by competitors and the more liberal generic drug approval policy, drug companies can no longer afford a full detail force to market their proprietary drugs. At present, high quality video cassettes are produced about the drug, and are sent directly to the physician in an attempt to supplement the sales force.

One embodiment of the invention provides ready access to audio-visual information about various drugs available to the physician. As with the real estate application, a third party text database may be used, for example, an on-line version of the "Physicians Desk Reference." The physician may simply search through the on-line database and select a list of drugs that the physician would like to view on video. The system will search for, locate, and download the requested audio-visual information. The drug videos may serve a variety of functions. For example, the physician may use this audio-visual information to learn about new drugs, or simply to refresh or update their knowledge about existing drugs. Also, drug companies may place advertisements about promotional drugs on the video clips for use by the physician.

Example 3

Retail Services

Another application of the invention is directed towards the retail industry, for example, the sale, lease and/or rental of new and used automobiles. The text database could include a listing of automobiles, price data, performance data, etc. The video clip retrieval system would retrieve pertinent video clips, thereby enhancing the available text database. Another application in the retail arena would be to provide multi-media information on businesses or services such as those listed in the "yellow pages."

Example 4

Personnel

A further application could be directed to the personnel industry, where video presentations could be used to enhance available text information profiles on specified employees. Such information may encompass providing information to healthcare providers about existing and prospective patients. The system may also be used to provide information about the healthcare providers to patients. These videos clips would help the patients/consumer make a selection, by providing a way to screen the physicians by providing background information on education and areas of expertise, as well as providing a video depiction of the hospital or clinic.

Example 5

Dating Services

The dating service industry is yet another area where the video clip retrieval system could be utilized. Video clips of potential "dates" could be shown by the dating service to assist customers in obtaining suitable partners.

Example 6

Travel Services

Yet another application of the system is in the travel business where travel agents can access video clips of holiday locations for customers to view.

What is claimed is:

1. A method for storing and retrieving a video presentation from a distributed network, comprising the steps of:

- distributing a plurality of storage and retrieval units capable of communication with a decentralized network, wherein each storable and retrieval unit comprises a collection of video presentations;
- associating at least one index manager with one or more storage and retrieval units, wherein each index manager communicates with at least one other index manager and each index manager maintains a database of video presentations stored on at least a portion of the storage and retrieval units;
- formulatingy a request for a video presentation at a multimedia terminal;
- specifying at least one storage and retrieval unit as a local storage and retrieval unit associated with the multimedia terminal;
- transmitting the request from the multimedia terminal to a local storage and retrieval unit;
- searching the local storage and retrieval unit to determine whether any of the request can be satisfied from the collection of video presentations stored by the local storage and retrieval unit;
- if any of the request can be satisfied, transmitting at least one presentation satisfying the request from a local storage and retrieval unit for delivery to the multimedia terminal;
- if any of the request is not satisfied, identifying at least one index manager as a primary index manager for a local storage and retrieval unit associated with the multimedia terminal;
- forwarding all or part of the request to a primary index manager;
- searching a database on the primary index manager to determine at least one storage location for each video presentation satisfying all or part of the request from among a first set of storage and retrieval units;
- if any of the forwarded request can be satisfied, transmitting at least one presentation satisfying the request, from at least one of the storage and retrieval units in the first set of storage and retrieval units, for delivery to the multimedia terminal;
- if any of the request is not satisfied, identifying at least one index manager as a secondary index manager;
- forwarding all or part of the request to at least one secondary index manager,
- searching a database on the secondary index manager to determine a storage location for each video presentation satisfying the forwarded request from among a second set of storage and retrieval units; and
- if any of the forwarded request can be satisfied, transmitting at least one presentation satisfying the request, from at least one storage and retrieval unit in the second set of storage and retrieval units, for delivery to the multimedia terminal.

2. A method according to claim 1, additionally comprising the step of invoking a data sequencing interface to handle the delivery of at least one video presentation from a storage and retrieval unit to a multimedia terminal.

3. A method according to claim 1, additionally comprising the step of storing one or more video presentations on one or more local storage and retrieval units in a compressed format.

4. A method according to claim 1, wherein at least one video presentation delivered to a multimedia terminal is at least one of downloaded, stored and displayed by the multimedia terminal.

5. A method according to claim 4, additionally comprising the steps of storing one or more video presentations on one or more local storage and retrieval units in a compressed format, and decompressing the presentation for display at a multimedia terminal.

6. A method according to claim 2, wherein each data sequencing interface is in communication with at least one index manager.

7. A method according to claim 1, wherein each index manager maintains a database of video presentation usage.

8. A method according to claim 7, wherein maintaining a database of video presentation usage includes the step of logging requests.

9. A method according to claim 7, wherein maintaining a database of video presentation usage includes the step of logging video presentation deliveries.

10. A method according to claim 8, wherein maintaining a database of video presentation usage further includes the step of logging video presentation deliveries.

11. A method according to claim 8, wherein the step of logging a request includes associating a regional identifier with the request.

12. A method according to claim 9, wherein the step of logging a delivery includes associating a regional identifier with the delivery.

13. A method according to claim 8, wherein logging a request includes recording at least one of the date, the time, all or part of the request, an identification of the multimedia terminal making the request, an identification of at least one storage and retrieval unit contacted in connection with the request, an identification of at least one index manager contacted in connection with the request, an indication of whether any of the request is or can be satisfied, and a regional identifier associated with the request.

14. A method according to claim 9, wherein logging a delivery includes recording at least one of the date, the time, all or part of a request associated with the delivery, an identification of the multimedia terminal receiving the delivery, an identification of at least one storage and retrieval unit contacted to provide a delivery, an identification of at least one index manager contacted in connection with a corresponding request or delivery, an indication whether a delivery has been successful, an indication whether a delivery satisfies all or part of a request, and a regional identifier associated with one or more of any source or destination for a request or delivery.

15. A method according to claim 13, wherein at least one logging function is mediated by a data sequencing interface.

16. A method according to claim 14, wherein at least one logging function is mediated by a data sequencing interface.

17. A method according to claim 7, comprising the additional steps of:
   evaluating video usage based on information from one or more databases maintained by one or more index managers;
   as a function at least in part of evaluated video usage, performing at least one of
   adding one or more video presentations to a collection of video presentations stored by at least one storage and retrieval unit, and
   removing one or more video presentations from a collection of video presentations stored on at least one storage and retrieval unit; and
   updating at least one database of at least one index manager to record at least one video presentation that is added or removed.

18. A method according to claim 17, wherein the evaluation of video usage includes consideration of at least one of the logging of requests, the logging of deliveries, the video presentation content of one or more storage and retrieval units, the date, the time, the storage capacity of one or more storage and retrieval units, and the communications load on the network.

19. A method according to claim 17, wherein each index manager adds to and removes from the collection of video presentations stored by storage and retrieval units with which it is associated.

20. A method according to claim 19, wherein each index manager communicates with at least one other index manager to perform at least one of
   updating the other index manager, and
   obtaining a video presentation for storage by a storage and retrieval unit associated with the index manager from a storage and retrieval unit associated with the other index manager.

21. A method according to claim 1, wherein each database is updated at least one of periodically or in real time.

* * * * *